Nov. 10, 1970  R. A. HARRIS  3,538,778
APPARATUS FOR ACCURATELY ALIGNING A DEVICE
WITH A WORKPIECE
Filed April 9, 1968
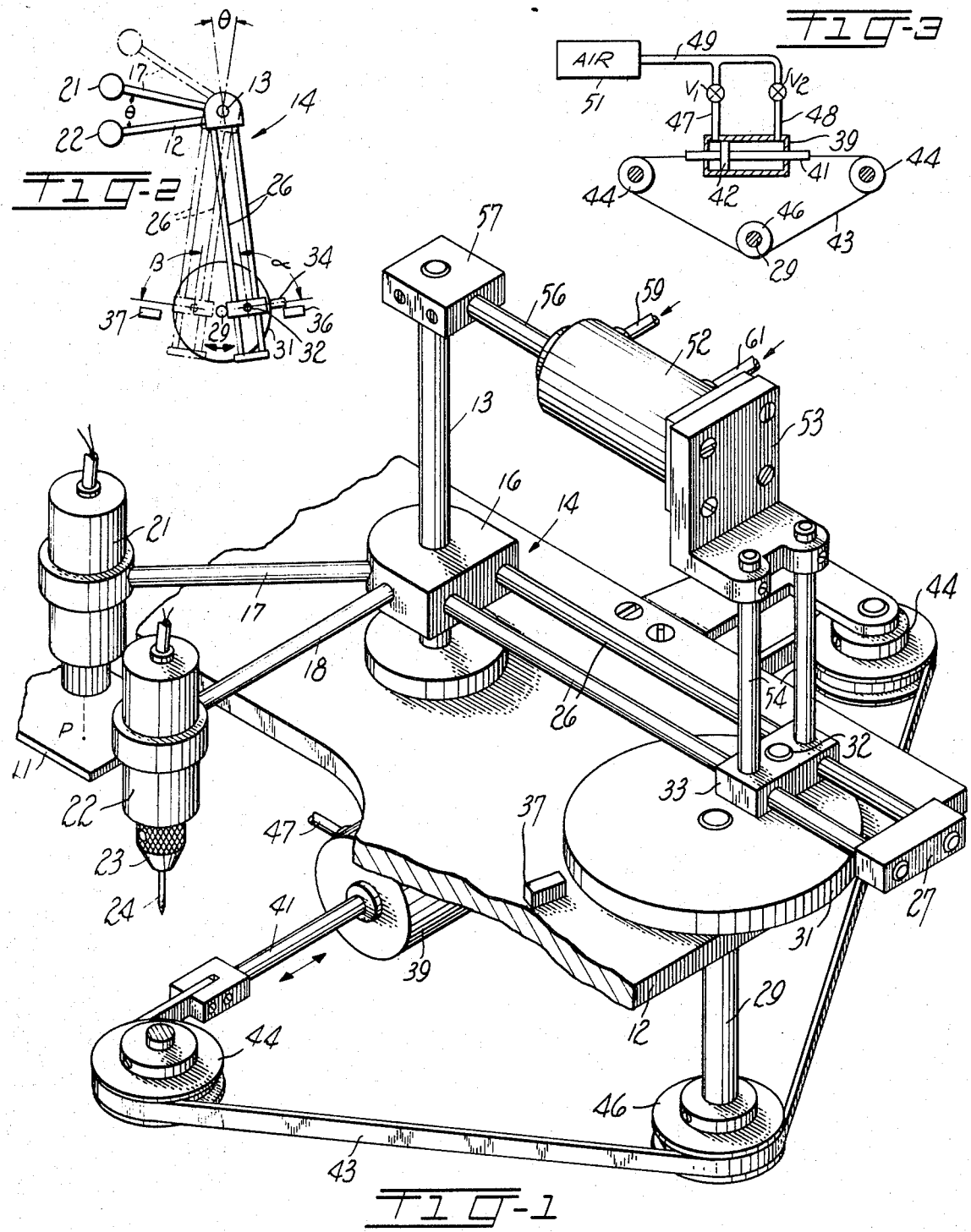
INVENTOR
R.A. HARRIS
D. W. Marko
BY
ATTORNEY United States Patent Office 3,538,778
Patented Nov. 10, 1970

3,538,778
APPARATUS FOR ACCURATELY ALIGNING A DEVICE WITH A WORKPIECE
Richard A. Harris, High Point, N.C., assignor to Western Electric Company, Incorporated, New York, N.Y., a corporation of New York
Filed Apr. 9, 1968, Ser. No. 719,910
Int. Cl. G05g 5/02; B23b 39/12
U.S. Cl. 74—96         7 Claims

ABSTRACT OF THE DISCLOSURE

An apparatus for accurately aligning a tool with a workpiece includes a support, mounted for pivoting movement about a fixed axis, on which a sensing device and the tool are mounted at equal radial distances from the fixed axis. A guide rod connected to the support and extending in a radial direction from the fixed axis is slidably engaged by a drive member which is pivotally mounted on a disc. Rotation of the disc between first and second angular positions results in pivoting of the support to alternately move the sensing device and the tool into alignment with the workpiece.

BACKGROUND OF THE INVENTION

Field of the invention

This invention is concerned with a positioning apparatus and in particular, with an apparatus wherein a device, or a tool, is moved into accurate alignment with a workpiece. The invention may be used, for example, in certain manufacturing operations where it is desirable to position two tools alternately in alignment with an axis through the workpiece.

Prior art

In the prior art, tools are usually alternately positioned over workpieces by various turrets or indexing mechanisms. Most of these turrets or indexing mechanisms employ positive stops or abutments to determine the precise positioning of the tool with respect to the workpiece. Due to dirt, oil film, inaccuracies in surfaces of the abutments and tools, etc., there may be an error of several thousandths of an inch when the various tools are positioned over the workpiece. Also, when a delicate device, such as a television camera, is positioned over the workpiece, the engagement of a positive stop, or abutment, may damage the delicate device.

SUMMARY OF THE INVENTION

It is an object of the present invention to provide an apparatus for aligning a device or a tool with respect to a workpiece with an accuracy which is much greater than that obtainable with prior art positioning mechanisms.

Another object of the invention is to provide for minimum deceleration of a delicate device when the device reaches the desired position.

The present invention contemplates a support upon which a tool or a pair of tools is attached for pivoting movement about a fixed axis. An arm connected to the support is slidably engaged by a drive member which is pivotally connected to a rotary member for pivoting the tool or tools into alignment with a workpiece. The rotary member rotates between first and second angular positions such that motion of the drive member and rotary member becomes tangential to the arm when the rotary member reaches the first or second angular position. The error in the positioning of the tool is a small fraction of the error in stopping the rotary member. Also, sudden stopping of the rotary member when it reaches the first or second angular position results in almost no jarring or sudden deceleration of the tool or tools.

Another feature of the invention utilizes a fluid piston device connected between the support and the drive member for accelerating the rotary member during the first half of the rotation between the first and second positions and for decelerating the rotary member during the last half of the rotation between the first and second positions. The fluid piston device decreases the time required to move a tool into position while further reducing any chance of a sudden jarring or deceleration of a tool when the rotary member reaches the first or second position.

BRIEF DESCRIPTION OF THE DRAWING

The principles of the present invention are illustrated by the apparatus shown in the accompanying drawing, wherein:

FIG. 1 is a perspective view of an apparatus, embodying the principles of the present invention, in which a viewing and a drilling device are mounted on a common support for pivoting movement about a fixed axis;

FIG. 2 is a plan view of the apparatus of FIG. 1, which illustrates the pivoting movement of the support and devices about the fixed axis; and FIG. 3 illustrates schematically a belt and pulley arrangement, operated by an air cylinder, which is utilized to impart pivoting movement to the support.

DETAILED DESCRIPTION

Referring to FIG. 1, an apparatus for drilling holes at precisely located points on a workpiece 11, such as a printed circuit board, is shown. The apparatus includes a base plate 12 on which a vertical shaft 13 is mounted. The shaft 13 defines a first fixed axis about which pivoting movement may occur. A support 14 is mounted on the shaft 13 for pivoting movement about the fixed axis defined by the vertical shaft 13.

The support 14 includes a collar 16 which is pivotally received on the shaft 13. A pair of supporting rods 17 and 18 are secured to the collar 16 and extend in radial directions from the shaft 13. The support rod 17 supports a viewing device 21, such as a television camera, and the support rod 18 supports a drilling device 22. The viewing device 21 and drilling device 22 are located at equal radial distances from the shaft 13. The viewing device 21 may be of the type described in F. H. Blitchington application Ser. No. 719,923, filed Apr. 9, 1968, and assigned to Western Electric Company, Inc. As described in that application, the device 21 senses a point P on the workpiece 11 and moves the workpiece 11 until the point P is accurately aligned with suitable alignment means, such as cross hairs, in the viewing device 21. The drilling device 22 is provided with a chuck 23 for holding a drill 24. The positions of the viewing device 21 and the drilling device 22 relative to the vertical shaft 13, are arranged such that the alignment means of the viewing device 21 and the drill 24, supported by the drilling device 22, are located at equal radial distances from first fixed axis defined by the shaft 13.

The support 14 is also provided with a pair of parallel guide rods 26—26 which extend in a direction parallel to a radial direction from the shaft 13. The extended ends of the guide rods 26—26 are received by a clamp 27 which maintains the guide rods 26—26 in a parallel relationship.

The base plate 12 supports a second vertical shaft 29 for rotation, relative to the base plate 12, in a bearing (not shown). A disc 31 is connected to the shaft 29 and is mounted for rotation about its center by the shaft 29.

The disc 31 supports a pivot pin 32 which is located a predetermined radial distance from the center of the disc 31. A slide 33 is pivotally mounted on the disc 31 by the pivot pin 32. The slide 33 has a pair of openings extending therethrough for receiving the parallel guide rods 26—26. Thus, the slide 33 is mounted for both sliding movement along the guide rods 26—26 and pivoting movement about the pivot pin 32.

Referring to FIG. 2, a pin 34 extends outward from the edge of the disc 31. The pin 34 cooperates with a pair of stops 36 and 37, mounted on the base plate 12, to define first and second predetermined angular positions between which the disc 31 may be rotated. The first angular position, i.e., the position of the disc 31 with the pin 34 in contact with the stop 36, is selected such that the viewing device 21 is located over the workpiece 11. The second angular position, i.e., the position of the disc 31 with pin 34 in contact with the stop 37, is selected such that the drilling device 22 is located over the workpiece 11. Thus, by rotation of the disc 31 between its first and second angular positions, the viewing device 21 and the drilling device 22 may be alternately positioned over the workpiece 11.

In order to provide for accurate positioning of the viewing device 21 and the drilling device 22 over the workpiece 11, the apparatus is designed to minimize positioning error resulting from failure to exactly locate the disc 31 in either its first or second angular position. Rotation of the disc 31 produces movement of the pivot pin 32 in a circular path about the shaft 29. This circular movement of the pivot pin 32 is converted into pivoting movement of the support 14 by the cooperation between guide rods 26—26 and slide 33. The stops 36 and 37 establish first and second angular positions, respectively, which are the limits of rotation for the disc 31. The first and second angular positions are selected such that the guide rods 26—26 are tangent to the circular path, in which the pivot pin 32 is moved, when the disc 31 is located in either position. As a result, a small error in the final position of disc 31 does not significantly affect the angular position of the support 14 and the alignment of devices 21 and 22 with the workpiece 11.

Referring to FIGS. 1 and 3, an air cylinder 39 having a piston rod 41, extending completely therethrough, on which a piston 42 is mounted, is provided for imparting rotation to the disc 31. The opposite ends of the piston rod 41 are connected to a belt 43 which passes over pulleys 44—44, rotatably mounted on the base plate 12, and a pulley 46 which is secured to the shaft 29.

As shown in FIG. 3, air hoses 47 and 48 are connected to opposite ends of the air cylinder 39 for admitting pressurized air to the interior of the air cylinder 39. The air hoses 47 and 48 are connected through valves V1 and V2, respectively, to a line 49 to which pressurized air is supplied by a source 51.

Referring to FIG. 1, the apparatus is also provided with an air cylinder 52 which is mounted on a bracket 53 connected to the slide 33 by a pair of vertical rods 54—54. The air cylinder 52 has a piston rod 56 extending therefrom which is connected by a block 57 to the vertical shaft 13. The block 57 has a bore formed therein for receiving the shaft 13. Pressurized air may be applied to the air cylinder 52 through air hose 59 located at one end of the air cylinder 52 to accelerate rotation of the disc 31 during the first half of the rotation of the disc 31 between stops 36 and 37 to decelerate rotation of the disc 31 during the last half of the rotation of the disc 31 between stops 36 and 37.

OPERATION

In the operation of the apparatus of the present invention, the components of the apparatus are initially in the positions shown in FIG. 1. To locate the components in the initial positions, air cylinder 39 is operated by opening valve V1 to admit pressurized air to the interior of the air cylinder 39 to drive the piston rod 41 and the piston 42 to the right, as viewed in FIG. 3. This movement of the piston rod 41 rotates the shaft 29 and the disc 31 in a clockwise direction, as viewed in FIG. 2, to drive the pin 34 against the stop 36. The disc 31 is thus located in its first angular position. At this point, the angle $\alpha$ defined by a first line extending radially from the shaft 13 through the pivot pin 32 and a second line extending radially from the shaft 29 through the pivot pin 32, is a right angle.

With the disc 31 located in its first angular position, a workpiece 11 is positioned beneath the viewing device 21. Then a point P, located on the workpiece 11, at which a drilling operation is to be performed, is aligned with the position determined by the cross hairs of the viewing device 21. After the alignment of the workpiece 11 is completed, the air cylinder 39 is operated by opening valve V2 to admit pressurized air to the interior of the air cylinder 39. The piston rod 41 and piston 42 move to the left, as viewed in FIG. 3, to rotate the shaft 29 and disc 31 in a counterclockwise direction, as viewed in FIG. 2. The disc 31 is thus moved from its first angular position to its second angular position where the pin 34 contacts the stop 37. With the disc in this position, the angle $\beta$ defined by a first line extending radially from the shaft 13 through the pivot pin 32 and a second line extending radially from the shaft 29 through the pivot pin 32, is also a right angle.

The rotational movement of the disc 31 about the axis of the shaft 29 results in movement of the slide 33 in a circular path about the axis of the shaft 29. This movement of the slide 33 in a circular path results in sliding movement of the slide 33 along the guide rods 26. During the first half of the movement of the slide 33 in a circular path, the slide 33 moves along the guide rods 26—26 in a radial direction toward the shaft 13. In the second half of the movement of the slide 33 in its circular path, the slide 33 moves along the guide rods 26—26 in a radial direction away from the shaft 13. At the same time, the movement of the slide 33 in the circular path imparts pivoting movement to the guide rods 26—26 about shaft 13 through an angle $\theta$. Thus, the rotational movement of the disc 31 results in pivoting of the support 14, about the first axis defined by the shaft 13, by an angular distance $\theta$.

Referring to FIG. 2, the central angle defined by the locations of the devices 21 and 22, relative to the shaft 13, is equal to the angular distance $\theta$ by which the support 14 is pivoted by the rotation of the disc 31. When the support 14 is pivoted in a clockwise direction by an angular distance $\theta$, the viewing device 21 is pivoted away from the workpiece 11, and the drilling device 22 is moved into precisely the same position that was previously occupied by the viewing device 21. At this point, the drilling device may be operated to drill a hole in the workpiece 11 at point P which was previously aligned with the cross hairs of the viewing device 21. After the drilling operation is completed, the disc 31 may be returned to its first angular position by operation of the air cylinder 39 to position the viewing device 21 over the workpiece 11. Since, as mentioned above, the guide rods 26—26 approach a position tangent to the circular path defined by the motion of the pivot pin 32, when the disc 31 is moved toward either its first or second angular position, the error in the alignment of the viewing device 21, or the drilling device 22, with the workpiece 11, resulting from a small error in the final position of disc 31, is minimal.

Considering the operation in more detail, the angular distance by which the support 14 is pivoted depends upon the angular position of the disc 31. When the disc 31 is located in its first angular position (FIG. 2), such that the guide rods 26—26 are tangent to the circular path of the pivot pin 32, movement of the disc 31 away from the first angular position initially produces a very small change in the angular position of the support 14. Using the axis of shaft 13 as a reference, the initial motion of the pivot pin 32 and slide 33 has a large radial component and a small tangential component. As the disc 31 moves away from its first angular position, the size of the tangential component of motion of the pivot pin 32 increases relative to the radial component of motion. Changes in the angular position of disc 31 have greater effect on the angular position of the support 14. This effect on the angular position of support 14 increases until the disc 31 has moved to a position halfway between its first and second angular positions.

After the disc 31 moved to the halfway position, the effect of further rotation of the disc 31 on the angular position of the support 14 decreases. As the disc 31 approaches its second angular position, the motion of the pivot pin 32 again has a radial component of motion which is greater than its tangential component of motion. Thus, rotation of the disc 31, near its second angular position, does not have a significant effect upon the angular position of support 14.

From the above description, it should be noted that the angular position of the support 14, as the disc 31 approaches either its first or second angular position, is not substantially changed by rotation of the disc 31. Because of the relationship between the angular positions of the disc 31 and the support 14, a small error in the final position of the disc 31 does not significantly affect the angular position of the support 14. This relationship allows the viewing device 21 and the drilling device 22 to be alternately moved into a precisely defined position over the workpiece 11. It can also be noted that the angular velocity of the support 14 is almost nil when the disc 31 approaches either its first or second angular position. The engagement of the pin 34 against either stop 36 or 37 produces almost no jarring or sudden deceleration of the viewing device 21. A sudden deceleration of a viewing device, such as a television camera, could damage the viewing device.

The air cylinder 52 is provided to minimize error in positioning the disc 31 in either its first or second angular position. During rotation of the disc 31 about the axis defined by shaft 29, the air cylinder 52 is operated by applying pressurized air to the air hose 59. This application of pressurized air to the interior of the air cylinder 52 tends to draw the piston rod 56 into the air cylinder 52 to apply a force to the slide 33 which tends to accelerate the slide 33 in a radial direction toward the shaft 13. This force has an accelerating effect on tht slide 33 during the first half of the movement of the disc 31 between its first and second angular positions. Once the disc 31 has passed the midpoint in its movement between its first and second angular positions, the force applied to the slide 33 by the air cylinder 52 has a decelerating effect upon the movement of the slide 33 along the guide rods 26 and relative to the shaft 13. As a result, the motion of the disc 31 is decelerated as the disc approaches its second angular position.

The decelerating force acting on disc 31 decreases the tendency of the disc 31 to rebound when the pin 34 contacts the stop 37. In this manner, the force applied by the air cylinder 52 aids in bringing the disc 31 to a stop in a position very close to its second angular position. The air cylinder 52 supplements the action of the guide rods 26—26, the disc 31, and the slide 33 in accurately positioning the drilling device 22 in the precise position previously occupied by the viewing device 21 to accurately align the drill 24 with the point P on the workpiece 11 to be drilled.

The apparatus described above illustrates one embodiment of the present invention in which the principles of the present invention may be advantageously employed. Modifications in the apparatus may be made by persons of ordinary skill in the art without departing from the scope of the invention.

I claim:
1. In an apparatus for moving a device between first and second positions:
   support means mounted to pivot about a fixed axis for supporting a device to move between first and second positions;
   a drive member slidably engaging said support means;
   means for limiting said drive member to substantially radial movement relative to said support means; and
   means for moving said drive member between first and second points in an arcuate path to advance said drive member along said limiting means and pivot said support means about said fixed axis to move the device between said first and second positions, said limiting means and said moving means arranged such that the radial movement of said drive member relative to said support means is substantially tangential to the arcuate path at said first and second points.

2. In a positioning mechanism for moving a device from a first position to a second position:
   support means mounted to pivot about a fixed axis for supporting a device to move between first and second positions;
   an arm extending in a substantially radial direction from said support means;
   a rotary member mounted for rotation;
   means mounted on said rotary member for slidably engaging said arm; and
   means for imparting rotation to said rotary member between first and second angular positions to pivot said arm and said support about said fixed axis to move the device between said first and second positions, said arm being substantially tangential to the movement of said slidably engaging means at the first and second angular positions.

3. An apparatus for accurately moving a device between first and second positions, which comprises:
   support means mounted to pivot about a first axis for supporting a device to move between first and second positions;
   an arm connected to said support means and extending in a radial direction from said first axis, through which pivoting movement is imparted to said support means;
   a member mounted to rotate about a second axis between first and second angular positions;
   means pivotally mounted on said member, at a pivot point, displaced from said second axis along a radius, for slidably receiving said arm, said pivot point selected such that said arm forms substantially a right angle with said radius when said member is located in either its first or second angular positions; and
   means for rotating said member between its first and second angular positions to pivot said support means about said first axis and accurately move the device between said first and second positions.

4. An apparatus for alternately moving first and second devices into a predetermined position, which comprises:
   support means mounted to pivot about a first fixed axis for supporting first and second devices at equal radial distances from said first fixed axis;
   guide means formed on said support means and extending in a radial direction from said first fixed axis;
   a drive member slidably engaging said guide means; and
   means for moving said drive member in a circular path, about a second fixed axis, between first and second points on said circular path which are selected such that said radial direction of said guide means is tangent to said circular path when said drive member is located at either said first or second point.

5. An apparatus for alternately moving first and second devices into a predetermined position, as set forth in claim 4, which includes:
   means for applying a force to said drive member in a direction toward said first fixed axis, the force acting to accelerate movement of said drive member toward said fixed axis during movement of said drive member along the first half of said circular path, and to decelerate such movement of said drive member during its movement along the second half of said circular path.

6. An apparatus for alternately moving first and second devices into a predetermined position, which comprises:
   support means mounted to pivot about a fixed axis, for supporting first and second devices at equal radial distances from said fixed axis, said devices being spaced apart by a predetermined angular distance;
   an arm connected to said support means and extending in a radial direction from said fixed axis;
   a disc mounted to rotate about its center between first and second angular positions;
   a slide pivotally mounted on the periphery of said disc, at a pivot point located on a radius of said disc, for slidably receiving said arm, said pivot point selected such that said arm forms a right angle with the disc radius when said disc is located in either its first or second angular positions; and
   means for rotating said disc between its first and second angular positions to pivot said arm and said support means about said fixed point by an angular distance equal to the predetermined angular distance between the first and second devices to move said devices alternately into a predetermined position.

7. An apparatus for alternately moving first and second devices into a predetermined position, as set forth in claim 6, which includes:
   a pair of stops mounted adjacent to said disc and spaced apart by a predetermined angular distance; and
   means projecting from said disc for alternately engaging said stops to limit rotation of said disc between first and second angular positions.

References Cited
UNITED STATES PATENTS

| | | | |
|---|---|---|---|
| 164,212 | 6/1875 | Prouty | 74—96 |
| 2,290,766 | 7/1942 | Pégard | 77—27 |
| 2,455,529 | 12/1948 | Shortt | 74—96 |
| 3,088,341 | 5/1963 | García | 77—31 |
| 3,367,375 | 2/1968 | Watson | 77—27 |

WESLEY S. RATLIFF, Jr., Primary Examiner

U.S. Cl. X.R.

77—27